United States Patent
Desai et al.

(10) Patent No.: US 9,391,926 B2
(45) Date of Patent: Jul. 12, 2016

(54) SYSTEMS AND METHODS FOR STACKING FIBRE CHANNEL SWITCHES WITH FIBRE CHANNEL OVER ETHERNET STACKING LINKS

(71) Applicant: DELL PRODUCTS L.P., Round Rock, TX (US)

(72) Inventors: Hiren A. Desai, San Jose, CA (US); Haresh K. Shah, Los Altos Hills, CA (US); Krishnamurthy Subramanian, Mountain View, CA (US); Swaminathan Sundararaman, Cupertino, CA (US); Saikrishna M. Kotha, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 192 days.

(21) Appl. No.: 13/662,145

(22) Filed: Oct. 26, 2012

(65) Prior Publication Data

US 2014/0119371 A1    May 1, 2014

(51) Int. Cl.
*H04L 12/931*    (2013.01)

(52) U.S. Cl.
CPC ............ *H04L 49/357* (2013.01); *H04L 49/351* (2013.01)

(58) Field of Classification Search
CPC ... H04L 49/357; H04L 12/4633; H04L 45/00; H04L 69/08; H04L 49/351; H04L 12/46; H04L 49/10; H04L 2212/0025; H04L 69/22; H04L 12/66; H04L 12/64; H04L 45/74; H04L 61/6045
USPC ............... 370/389, 392, 395.5, 466, 471, 474
See application file for complete search history.

(56) References Cited

U.S. PATENT DOCUMENTS

| | | | |
|---|---|---|---|
| 7,646,767 B2 * | 1/2010 | Dropps | H04L 45/00 370/359 |
| 8,351,448 B1 * | 1/2013 | McGlaughlin | H04L 49/356 370/252 |
| 8,625,427 B1 * | 1/2014 | Terry | 370/235 |
| 8,867,552 B2 * | 10/2014 | Vobbilisetty | H04L 45/46 370/219 |
| 9,191,315 B1 * | 11/2015 | Mizrahi | H04L 45/00 |
| 2003/0118053 A1 * | 6/2003 | Edsall et al. | 370/474 |
| 2004/0153854 A1 * | 8/2004 | Agrawal et al. | 714/43 |
| 2006/0251067 A1 * | 11/2006 | DeSanti | H04L 29/12801 370/389 |
| 2008/0056300 A1 * | 3/2008 | Williams | 370/466 |
| 2008/0159260 A1 * | 7/2008 | Vobbilisetty et al. | 370/351 |
| 2009/0245791 A1 * | 10/2009 | Thaler et al. | 398/45 |
| 2010/0214950 A1 * | 8/2010 | Vobbilisetty | 370/254 |
| 2011/0051733 A1 * | 3/2011 | Hirata | 370/400 |
| 2011/0255540 A1 * | 10/2011 | Mizrahi et al. | 370/392 |
| 2011/0268125 A1 * | 11/2011 | Vobbilisetty et al. | 370/395.53 |

(Continued)

*Primary Examiner* — Gary Mui
*Assistant Examiner* — Michael Phillips
(74) *Attorney, Agent, or Firm* — Haynes & Boone, LLP (57) ABSTRACT

An information handling system is provided. The information handling system includes systems and methods for expanding the port count in a single Fiber Channel domain by adding modular Fiber Channel switches. Such a system includes a system enclosure that contains a plurality of Fiber Channel modules configured to send and receive Fiber Channel packets, the Fiber Channel modules providing a plurality of Fiber Channel ports and a switch processor coupled to the plurality of Fiber Channel ports and to a plurality of Ethernet ports. The switch processor is configured to apply a stacking header to Fiber Channel packets for transmission from one of the plurality of Ethernet ports over a stacking link to another switch processor in another system enclosure.

16 Claims, 5 Drawing Sheets

(56) References Cited

U.S. PATENT DOCUMENTS

| | | | |
|---|---|---|---|
| 2012/0039163 A1* | 2/2012 | Nakajima | H04L 41/0654 370/217 |
| 2012/0106957 A1* | 5/2012 | Willeke et al. | 398/58 |
| 2012/0134672 A1* | 5/2012 | Banerjee | H04L 49/70 398/45 |
| 2012/0163376 A1* | 6/2012 | Shukla | H04L 12/413 370/388 |
| 2012/0177039 A1* | 7/2012 | Berman | 370/390 |
| 2012/0327936 A1* | 12/2012 | Melman et al. | 370/392 |
| 2013/0028135 A1* | 1/2013 | Berman | 370/254 |
| 2013/0051235 A1* | 2/2013 | Song et al. | 370/235 |
| 2013/0182708 A1* | 7/2013 | Sharma et al. | 370/392 |
| 2014/0056298 A1* | 2/2014 | Vobbilisetty | H04L 12/46 370/335 |
| 2014/0092908 A1* | 4/2014 | Berman | 370/392 |

* cited by examiner

SYSTEMS AND METHODS FOR STACKING FIBRE CHANNEL SWITCHES WITH FIBRE CHANNEL OVER ETHERNET STACKING LINKS

BACKGROUND

1. Technical Field

The present disclosure is related to information handling systems. In particular, embodiments disclosed herein are related to Fibre Channel switches in a storage area network.

2. Discussion of Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Currently, information handling system may include a wide variety of network implementations, with implementations varying in size and function. Storage area networks have become widespread for providing efficient access to large amounts of data storage. Fibre Channel technologies have gained in popularity in large part due to their effective use in storage area networks. However, in Fibre Channel systems there is a limited amount of domain space. Adding Fibre Channel ports into an existing domain in order to avoid using more of the domain space can be accomplished, but requires the use of "director-class" systems that are bulky and expensive. In this and in other respects, Fibre Channel has not proven to be entirely satisfactory.

SUMMARY

Consistent with some embodiments, there is provided an information handling system. The information handling system includes a system enclosure. The system enclosure includes or contains a plurality of Fibre Channel modules configured to send and receive Fibre Channel packets over a plurality of Fibre Channel ports provided by the Fibre Channel modules. The system enclosure also includes a switch processor coupled to the plurality of Fibre Channel ports and to a plurality of Ethernet ports. The switch processor is configured to apply a stacking header to Fibre Channel packets for transmission from one of the plurality of Ethernet ports over a stacking link to another switch processor in another system enclosure.

Consistent with some embodiments, there is further provided another information handling system. The information handling system includes a first Fibre Channel switch and a second Fibre Channel switch in a storage area network. A stacking link connects the first Fibre Channel switch to the second Fibre Channel switch, and both of the Fibre Channel switch are configured to apply a stacking header to a Fibre Channel packet before sending the packet over the stacking link.

Consistent with some embodiments, there is further provided a method for modularly expanding a number of ports in a Fibre Channel domain. The method includes steps of receiving a Fibre Channel packet at a data port of a first Fibre Channel switch and adding a stacking header to the Fibre Channel packet. The stacking header that is added allows for the transmission of the Fibre Channel packet over a stacking link. The method further includes a step of transmitting the packet to a second Fibre Channel switch over the stacking link.

These and other embodiments will be described in further detail below with respect to the following figures.

For clarity of discussion, elements having the same designation in the drawings may have the same or similar functions. The drawings may be better understood by referring to the following Detailed Description.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
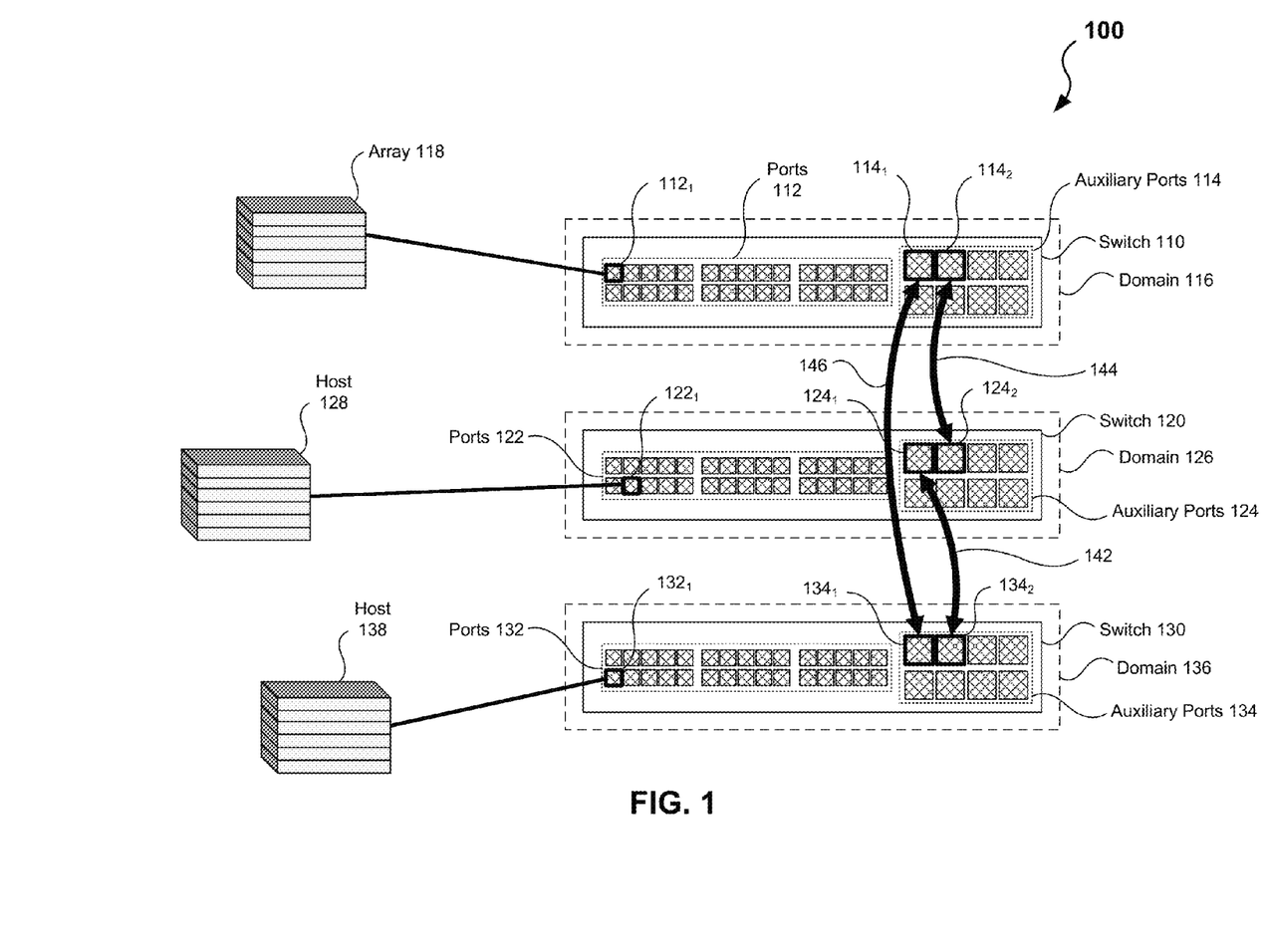
FIG. 1 is a diagram of an information handling system that includes a Fibre Channel storage area network with multiple domains.

FIG. 1 depicts an information handling system 100 that includes a Fibre Channel (FC) storage area network with multiple domains. Information handling system 100 includes a three Fibre Channel switches: FC switches 110, 120, and 130. Each of the FC switches depicted includes a plurality of FC data ports and a plurality of auxiliary ports. As depicted, FC switch 110 includes a plurality of data ports 112, including a data port $112_1$. FC switch 110 further includes a plurality of auxiliary ports 114 including an expansion port $114_1$ and an expansion port $114_2$, which may be used for connecting two Fibre Channel switches as will be discussed later. FC switch 110 is inside a domain 116.

In Fibre Channel-based networks, addresses are assigned to each network node. As part of the full address, there is a domain identifier. Generally, a domain identifier is assigned to a switch when it enters the network. Given the limited length of the full address, there is a limited length of the domain identifier. Thus, the domain space is limited, only a certain number of domains can be created in the network.

FC switch 110 may be connected to a number of devices such as hosts, servers, or FC storage arrays. In the depicted embodiment, an FC array 118 which has a host bus adaptor (not depicted) is coupled to data port $112_1$.

Many of the features described above in connection with FC switch 110 are generally applicable to FC switches 120 and 130. Thus, FC switch 120 includes a plurality of FC data ports 122, including a data port $122_1$, and a plurality of auxiliary ports 124, including an expansion port $124_1$ and an expansion port $124_2$. FC switch 120 is in a domain 126 and is connected to a FC host 128. Similarly, FC switch 130 includes a plurality of FC data ports 132, including a data port $132_1$, and a plurality of auxiliary ports 134, including an expansion port $134_1$ and an expansion port $134_2$. FC switch 120 is in a domain 136 and is connected to an FC host 138.

The three switches 110, 120, and 13 are connected to each other using expansion ports. Thus, FIG. 1 includes an inter-switch link (ISL) 142 between expansion port $134_2$ on switch 130 and expansion port $124_1$ on switch 120, an ISL 144 between expansion port $124_2$ and $114_2$, and an ISL 146 between expansion port $114_1$ and expansion port $134_1$. These three ISLs facilitate the exchange of packets between the switches 110, 120, and 130, and also between domains 116, 126, and 136.

In the Fibre Channel context, the domain may be analogous to the virtual local area network (VLAN) in an Ethernet context. Moving packets within a VLAN may be significantly easier than moving packets between VLANs. Similarly, moving packets within a domain may be significantly easier that moving packets between domains. To move packets between the separate domains 116, 126, and 136, the expansion ports, or "E ports," may employ the Fabric Shortest Path First (FSPF) routing protocol in order to communicate.

Figure 2:
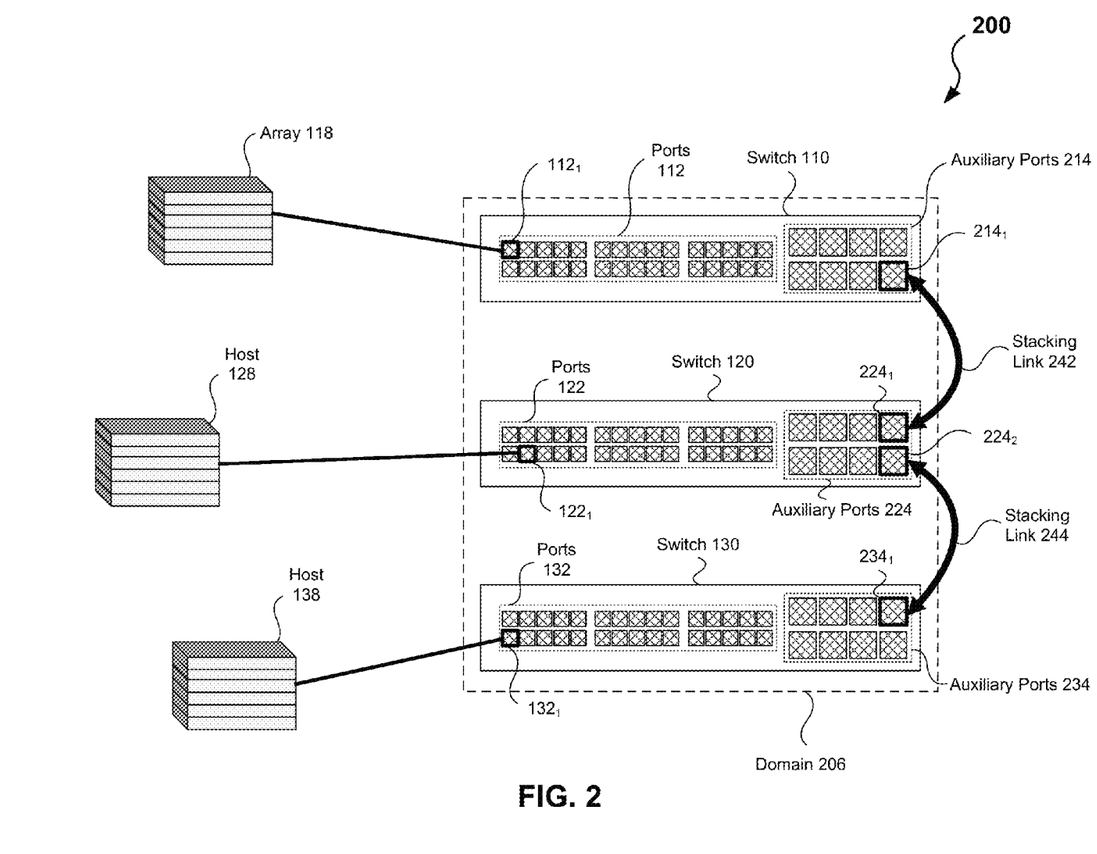
FIG. 2 is a diagram of an information handling system that includes a Fibre Channel storage area network that features multiple Fibre Channel switches in a single domain.

FIG. 2 depicts an information handling system 200 that includes a storage area network that features multiple switches in a single domain. The depicted embodiment contains three switches 110, 120, and 130, which may be similar to those of information handling system 100 in FIG. 1. Specifically, each of the three switches 110, 120, and 130 may include a plurality of data ports (plurality of data ports 112, 122, and 132, respectively) and a plurality of auxiliary ports (plurality of auxiliary ports 214, 224, and 234, respectively). Additionally, in some embodiments switch 110, 120, and 130 are one rack unit switches. In the depicted embodiment, each of switches 110, 120, and 130 includes thirty data ports and 8 auxiliary ports. In other embodiments the number of data and auxiliary ports may be significantly different. Additionally, switches 110, 120, and 130 may be Fibre Channel switches.

In order to provide access to storage in the storage area network of information handling system 200, each of the switches may be coupled to a server or other host system or a storage array. The storage array may include a plurality of hard disk drives or solid state drives configured in a redundant array of independent disks (RAID). As depicted, each switch is connected to a single such device, though in other embodiments, each of switches 110, 120, and 130 may be connected to as many such devices as the number of ports accommodates.

In information handling system 200, switches 110, 120, and 130 are connected in a single Fibre Channel domain 206 and coupled by a stacking link 242, between an auxiliary port $214_1$ on switch 110 and a an auxiliary port $224_1$ on switch 120, and a stacking link 244, between an auxiliary port $224_2$ and $234_1$ on switch 130. Stacking links 242 and 244 may both be standard Ethernet links, such as 40 Gbps links that provide for data center bridging functionality with lossless Ethernet. Rather than using Eports to connect the switches using ISLs as described above in connected with FIG. 1, information handling system 200 may use other ports on the switches.

Because stacking links 242 and 244 may allow packets to be moved from switch to switch within the domain, certain in-domain transmission techniques and benefits may be available in information handling system 200 that may not be available in information handling system 100. For instances, packets may be prioritized within a domain to allow quality of service to be improved for certain applications such as VoIP or video conferencing. Such priority may be allocated by given different VLANs within the domain differing priorities. Additionally, routing the packets within the domain may be conduct in a more efficient manner using lookup tables on each of switches 110, 120, and 130.

For example, using information handling system 200, a host 138 may transmit a package over a Fibre Channel link to a port $132_1$ on switch 130. This packet may have a FC header that includes an address for an array 118 connected to a port $112_1$ on switch 110. A networking processor on switch 130 may determine that the address is for a device connected to port $112_1$; the packet may be moved internally to port $243_1$ where it is sent over stacking link 244 to port $224_2$. Switch 120 may read a header of the packet to determine that the packet should be sent from port $224_1$ over stacking link 242 to switch 110 so it can be sent out on port $112_1$. These transmissions may be conducted using standard Ethernet routing techniques.

Because standard Ethernet techniques may be used to facilitate communication between switches over stacking links 242 and 244, the introduction of a new switch into domain 206 may be more straightforward. For example, if a user or operator of information handling system 200 wanted to add more ports to domain 206, an additional switch (not depicted) may be added directly into domain 206 by connecting the additional switch to one of switches 110, 120, and 130 using a stacking link as depicted in FIG. 2. Lookup tables on switches 110, 120, and 130 may be updated to reflect the presence of the additional switch. This expansion of the port count in information handling system 200 may be performed without "director-class" equipment, and may be fully modular, meaning a one unit switch, like switches 110, 120, and 130 in some embodiments, may be added as needed to accommodate growing needs of the user or operator of the information handling system.

Figure 3:
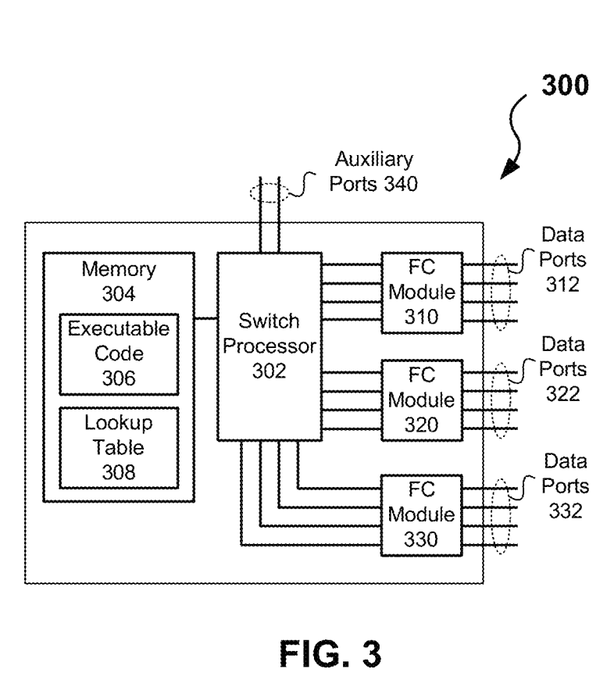
FIG. 3 is a functional diagram of a Fibre Channel switch according to an embodiment.

FIG. 3 provides a schematic representation of some of the internal functions of a switch 300 like those in information handling system 200 of FIG. 2. Switch 300 includes a switch processor 302. Switch processor 302 may be a networking processor. In some embodiments, switch processor 302 may be capable of deep packet inspection and manipulation, which may allow for prioritization of some packets over others and other features. Switch processor 302 is in communication with memory 304, which may contain executable code 306, which when run by switch processor 302 may direct specific operations. Memory 304, which may be any kind of computer memory, such as RAM, ROM, flash, or a storage drive, may also include a lookup table 308 that includes a mapping of media access control (MAC) address to respective ports, each port having a unique MAC address. Switch processor 302 may use the lookup table 308 when making determination as to where a particular packet is to be transmitted.

Switch 300 further includes a plurality of Fibre Channel modules. In the depicted embodiment, there are three FC modules, FC modules 310, 320, and 330, each having a plurality of data ports 312, 322, and 332, respectively. While each FC module is depicted as having four data ports, other embodiments may include more or fewer data ports. In the depicted embodiment, FC modules 310, 320, and 330 are application specific integrated circuits (ASICs). In other embodiments, FC modules 310, 320, and 330, and certain functions of processor 302, may include any appropriate combination of hardware and/or software having a processor, such as switch processor 302, and capable of reading executable code stored on a non-transitory, machine-readable medium for execution by the processor. When executed by switch processor 302 or FC modules 310, 320, and 330, these features may be caused to perform specific tasks. For example, such instructions may cause processor 302 and FC modules 310, 320, and 330 to performing table lookups of lookup table 308 or to apply and remove packet headers.

When a packet is received at an associated port, the receiving FC module may convert the packet from a FC channel packet, with a FC header as its outermost header, to a Fibre Channel over Ethernet (FCoE) packet, by adding on an FCoE header and transmitting the packet from the FC module over the depicted link to switch processor 302. Each data port depicted in FIG. 3 may have a separate and uniquely identifiable link to switch processor 302, thus each port may have its own MAC address.

Additionally, switch 300 includes a number of auxiliary ports 340. Auxiliary ports 340 may be used to couple an embodiment of switch 300 to another embodiment of switch 300, such as coupling switches 120 and 130 of the information handling system 200 of FIG. 2. As depicted in FIG. 3, there are two ports in auxiliary ports 340 and four ports each in data ports 312, 322, and 332. In most embodiments, the number of auxiliary ports 340 may be greater than the numbers depicted, thus the total number of ports on switch 300 may be significantly greater than the depicted embodiment.

Figure 4:
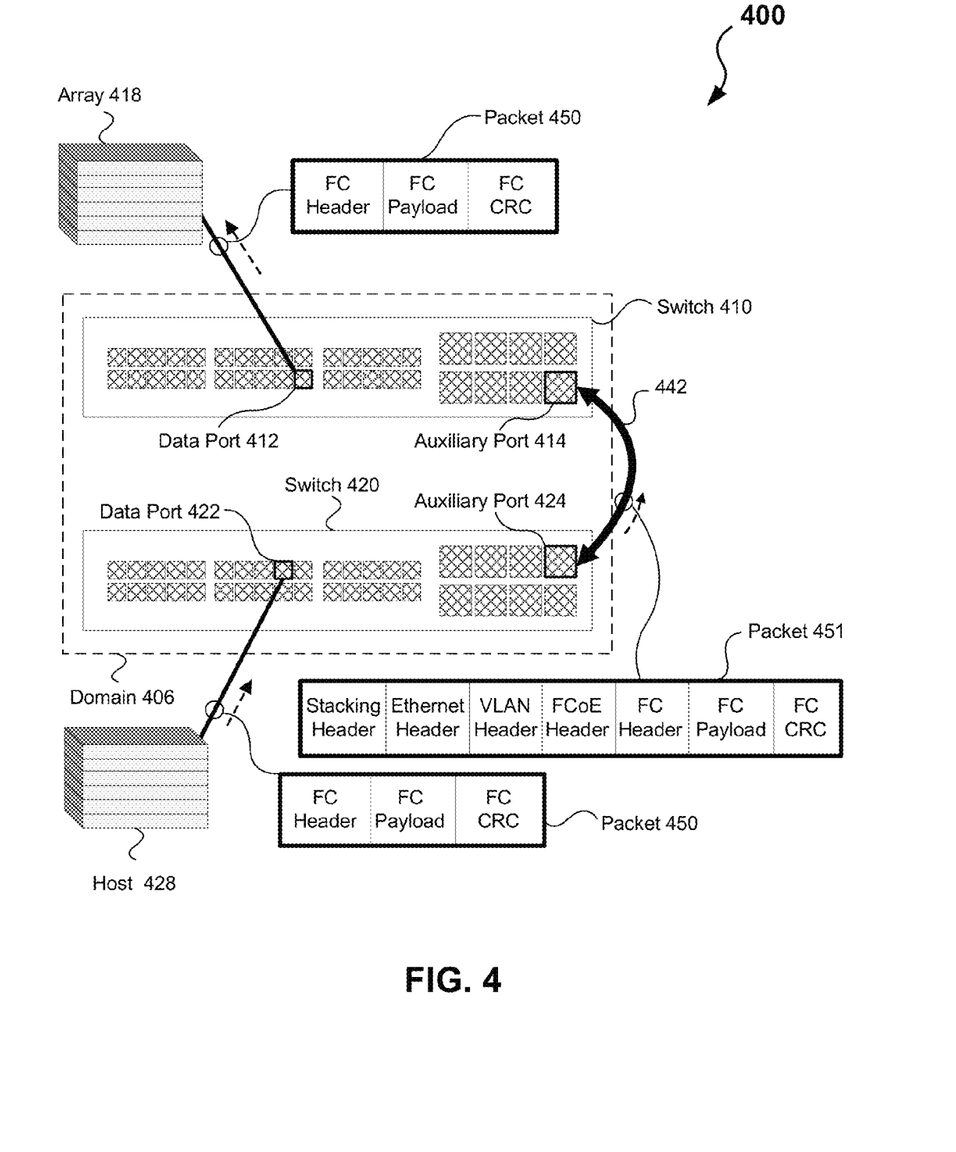
FIG. 4 is a diagram of an information handling system that includes multiple Fibre Channel switches in a single domain, including details regarding packets at different points in the information handling system according to an embodiment.

FIG. 4 depicts an information handling system 400 which includes two exemplary switches and includes further detail regarding the packets at different points in the system. Fibre Channel switches 410 and 420 are stacked in a single domain 406, and both switches may include the features described in connection with switch 300 of FIG. 3. FIG. 4 illustrates the movement of a packet 450 from host 428 to a storage array 418. In FIG. 4, the packet travels from host 428 to a data port 424 of switch 420. The data port 424 may communicate the packet to auxiliary port 424 as described above in connection with FIG. 3. Auxiliary port 424 may transmit the packet over a stacking link 442 to an auxiliary port 414 on switch 410. Then from a data port 412 on switch 410, the packet is finally transmitted to array 418.

When packet 450 is transmitted from host 428 to data port 424, it may include a Fibre Channel Cyclic Redundancy Check (CRC) code, a Fibre Channel payload to be stored in array 418, and a Fibre Channel header indicating the destination of the packet. When packet 450 reaches data port 424, the receiving FC module may encapsulate packet 450 with an FCoE header for transmission to the switch processor of switch 410. The switch processor may add further encapsulate packet 450 to create a packet 451 that can be transmitted over the stacking link 442 in accordance with standard Ethernet protocols.

Thus, while containing packet 450 in its entirety, packet 451 further includes headers added on by the switch processor and a header added on by the receiving FC module. Thus, packet 451 further may further an FCoE header, a VLAN header, an Ethernet header, and a stacking header. The stacking header may be a proprietary header, and may include additional information about the packet, such as priority information. The stacking header may indicate the switch to which packet 451 is to be sent. In this example, the stacking header in packet 451 includes an identifier of switch 410. Alternatively or additionally, the stacking header may include the MAC address of the port to which the packet is sent.

When packet 451 is received over the stacking link 442 at auxiliary port 414, the switch processor on switch 410 may remove the stacking header, the Ethernet header, and the VLAN header. The FCoE header of packet 451 may be removed by the FC module, thus returning packet 541 to packet 450. Packet 450 may then be transmitted to array 418.

Consistent with some embodiments, an additional switch, switch 430 (not depicted), may be added to information handling system 400. The switch 430, which may be a one rack unit switch, may be added to domain 406 by coupling an auxiliary port from switch 430 to another auxiliary port of either switch 410 or 420. The additional switch may have appropriate executable code thereon to read and handle packets like packet 451. In this way, domain 406 may have its port count expanded by the addition of switches. Having the switches in a single domain may simplify management of the storage environment.

Figure 5:
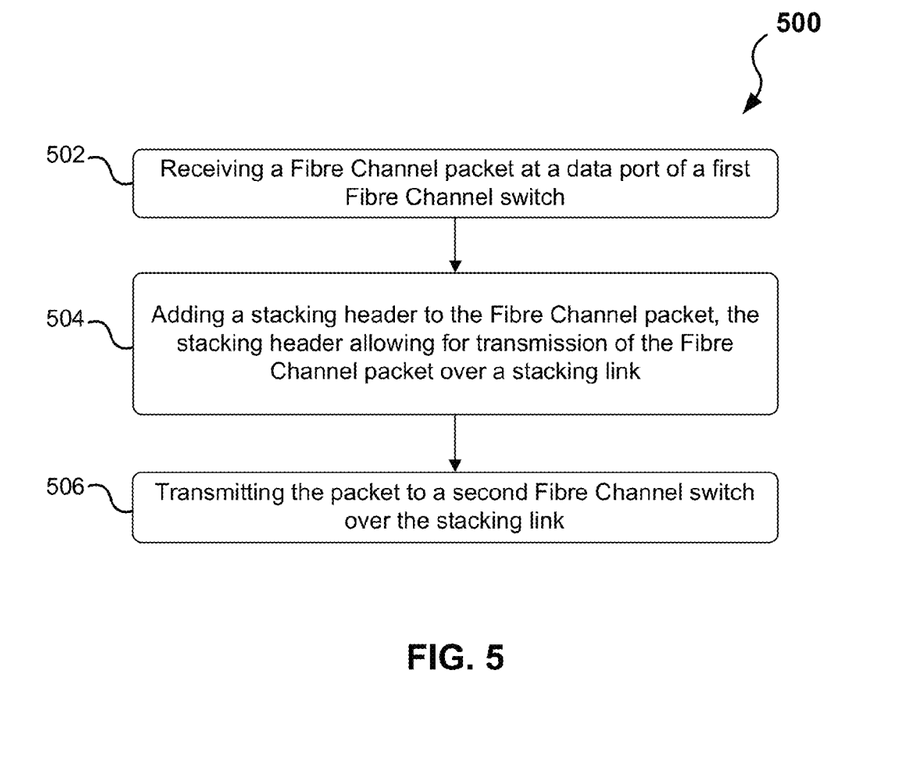
FIG. 5 is a flowchart of method for providing inter-switch communication in a Fibre Channel domain according to an embodiment.

FIG. 5 is a flowchart of a method 500 for providing interswitch communication in a Fibre Channel domain. Method 500 may begin in step 502 when a first Fibre Channel switch receives a Fibre Channel packet at a data port. The first Fibre Channel switch may add a stacking header onto the Fibre Channel packet in step 504, which may allow the Fibre Channel packet to be transmitted over a stacking link to a second Fibre Channel switch. In step 506, the first Fibre Channel switch may transmit the packet to a second Fibre Channel switch over the stacking link.

To better describe method 500, reference will be made to the information handling system 400 of FIG. 4 and switch 300 of FIG. 3. This reference is may be way of explanation and should not be considered as limiting the scope of method 500. This example of method 500 begins when a host 428, needing to send a packet to be stored in a storage array 418, sends a Fibre Channel packet to a data port 422 on a switch 420 that is connected to the host 428 (step 502). The data port is in communication with of provided by a Fibre Channel module that adds an FCoE header on the packet to transmit it to a switch processor on switch 420. When the switch processor receives the packet, it may query a lookup table using a destination MAC address contained in the FCoE header of the packet to determine its destination. When the switch processor determines that the packet must be transmitted to switch 410 in order to reach the storage array 418, the switch processor adds a stacking header to the packet with the FCoE still in place (step 504). In some embodiments the switch processor may also add an Ethernet header and a VLAN header.

After appending the stack header to the front of the packet, the switch processor on switch 420 transmits the packet from an auxiliary port 424 over a stacking link 442 to an auxiliary port 414 of switch 410. The auxiliary port 414 is in communication with a switch processor on switch 410 that removes the stacking header, and in embodiments containing them, the Ethernet header and the VLAN header as well. The packet still has its FCoE header which is used in the transmission of the pack to the port associated with the destination MAC address, in this example, data port 412. The Fibre Channel module associated with the MAC address of data port 412 then removes the FCoE header to send the Fibre Channel packet to storage array 418.

Some embodiments of information handling systems 200 and 400 include non-tangible, machine readable media that includes executable code that when run by a processor, such as switch processor 302 of switch 300 in FIG. 3, may cause the processor to perform the steps of method 500 as described above. Some common forms of machine-readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read. The machine-readable media may be memory 304 of FIG. 3.

The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. An information handling system comprising:
    a system enclosure, the system enclosure containing:
        a plurality of Fibre Channel modules configured to send and receive Fibre Channel packets, the plurality of Fibre Channel modules providing a plurality of Fibre Channel ports;
        a switch processor coupled to the plurality of Fibre Channel ports and to a plurality of Ethernet ports, wherein the switch processor is configured to:
            receive a Fibre Channel packet on one of the plurality of Fibre Channel ports;
            encapsulate the Fibre Channel packet in a Fibre Channel over Ethernet (FCoE) packet;
            encapsulate the FCoE packet in an Ethernet packet;
            encapsulate the Ethernet packet in a packet with a stacking header; and
            forward the packet with the stacking header to another switch processor in a same Fibre Channel domain over a stacking link;
            wherein the stacking header comprises an identifier of the another switch processor.

2. The information handling system of claim 1, wherein at least one of the plurality of Fibre Channel modules is provided by an application specific integrated processor.

3. The information handling system of claim 1, wherein the switch processor is further configured to apply a VLAN header to the FCoE packet before encapsulating it in the Ethernet packet.

4. The information handling system of claim 1, further comprising a lookup table associating a media access control (MAC) address with each of the plurality of Fibre Channel ports.

5. An information handling system comprising:
    a first Fibre Channel switch and a second Fibre Channel switch in a storage area network; and
    a stacking link connecting the first Fibre Channel switch to the second Fibre Channel switch, the first and second Fibre Channel switches being in a same Fibre Channel domain and further being configured to:
        receive Fibre Channel packets;
        encapsulate the Fibre Channel packets in Fibre Channel over Ethernet (FCoE) packets;
        encapsulate the FCoE packets in Ethernet packets;
        encapsulate the Ethernet packets in packets with a stacking header; and
        forward the packets with the stacking header over the stacking link;
        wherein:
            when the stacking header is applied by the first Fibre Channel switch, the stacking header comprises an identifier of the second Fibre Channel switch; and
            when the stacking header is applied by the second Fibre Channel switch, the stacking header comprises an identifier of the first Fibre Channel switch.

6. The information handling system of claim 5, further comprising:
    a Fibre Channel host connected to the first Fibre Channel switch; and
    a Fibre Channel storage array connected to the second Fibre Channel switch.

7. The information handling system of claim 5, wherein the first Fibre Channel switch is configured as a master Fibre Channel switch and the second Fibre Channel switch is configured as a member Fibre Channel switch.

8. The information handling system of claim 5, further comprising a third Fibre Channel switch, the third Fibre Channel switch being connected to the second Fibre Channel switch by an additional stacking link, and wherein the third Fibre Channel switch is also in the same Fibre Channel domain.

9. The information handling system of claim 5, wherein the Fibre Channel packets are sent according to a routing protocol other than fabric shortest path first (FSPF) protocol.

10. The information handling system of claim 5, wherein the first Fibre Channel switch comprises a first lookup table, and the second Fibre Channel switch comprises a second lookup table, wherein both the first and second lookup tables contain a mapping of media access control (MAC) addresses and a plurality of Fibre Channel ports included in each of the first and second Fibre Channel switches.

11. The information handling system of claim 5, wherein the stacking header contains an indication of relative packet priority of the packets with the stacking header.

12. A method for providing inter-switch communication in a Fibre Channel domain, the method comprising:
    receiving a Fibre Channel packet at a data port of a first Fibre Channel switch;
    encapsulating the Fibre Channel packet in a Fibre Channel over Ethernet (FCoE) packet;
    encapsulating the FCoE packet in an Ethernet packet;

encapsulating the Ethernet packet in a packet with a stacking header; and transmitting the packet with the stacking header to a second Fibre Channel switch in a same Fibre Channel domain over a stacking link;

wherein the stacking header comprises an identifier of the second Fibre Channel switch.

13. The method of claim 12, further comprising adding a VLAN header to the FCoE packet before encapsulating it in the Ethernet packet.

14. The method of claim 12, wherein a third Fibre Channel switch is in the Fibre Channel domain and is connected to the second Fibre Channel switch by an additional stacking link; and further comprising:

receiving the packet with the stacking header at the second Fibre Channel switch; and transmitting the packet with the stacking header from the second Fibre Channel switch over the additional stacking link to the third Fibre Channel switch in the Fibre Channel domain.

15. The method of claim 14, wherein the first, second, and third Fibre Channel switches are structurally separate switches.

16. The method of claim 12, wherein the stacking header contains information on a relative packet priority of the packet with the stacking header.

* * * * *